United States Patent [19]

Zaromb

[11] 4,254,190
[45] Mar. 3, 1981

[54] ELECTROCHEMICAL POWER GENERATION APPARATUS AND METHODS

[76] Inventor: Solomon Zaromb, 171 Clifton Ave., Newark, N.J. 07104

[21] Appl. No.: 80,185

[22] Filed: Oct. 1, 1979

Related U.S. Application Data

[60] Continuation-in-part of Ser. No. 20,967, Mar. 16, 1979, and a continuation-in-part of Ser. No. 917,406, Jun. 20, 1978, Pat. No. 4,198,475, and a continuation-in-part of Ser. No. 704,452, Jul. 12, 1976, abandoned, and a continuation-in-part of Ser. No. 938,395, Aug. 31, 1978, Pat. No. 4,207,382, said Ser. No. 20,967, is a division of Ser. No. 843,155, Oct. 17, 1977, Pat. No. 4,150,197, said Ser. No. 938,395, is a continuation of Ser. No. 813,483, Jul. 7, 1977, abandoned.

[51] Int. Cl.$^3$ .................................................. H01M 8/06
[52] U.S. Cl. ...................................... 429/15; 429/17; 429/19; 429/26; 429/27; 429/49
[58] Field of Search ................... 429/12, 13, 15, 17, 429/19, 26, 27, 29, 34, 72, 49

[56] References Cited

U.S. PATENT DOCUMENTS

| | | | |
|---|---|---|---|
| 3,172,784 | 3/1965 | Blackmer | 429/13 |
| 3,391,027 | 7/1968 | Porter | 429/13 |
| 3,887,400 | 6/1975 | Doniat et al. | 429/15 |
| 3,981,747 | 9/1976 | Doniat et al. | 429/15 |
| 4,150,197 | 4/1979 | Zaromb | 429/15 |
| 4,218,520 | 8/1980 | Zaromb | 429/15 |

*Primary Examiner*—Anthony Skapars

[57] ABSTRACT

Apparatus and methods for generating heat and electricity from the consumption of a variety of aluminum products comprise:

(a) a reaction chamber containing an aqueous electrolyte solution and adapted for introduction therein of aluminum pieces of various shapes and sizes up to a certain maximum predetermined size and for effecting a chemical reaction between said aqueous electrolyte and said aluminum pieces yielding aluminum hydroxide and an intermediate reactant;

(b) means for feeding said aluminum pieces into said reaction chamber in small quantities upon demand;

(c) means for removing the heat generated in said chamber as a result of said reaction;

(d) means for removing said aluminum hydroxide reaction product; and (e) means for oxidizing said intermediate reactant in an electrochemical cell, thereby generating electrical energy.

The intermediate reactant is preferably hydrogen or zinc. The latter may be used in a slurry type zinc/air battery, whereas hydrogen is preferably reacted in conjunction with a nongaseous cathode reactant, which may be a liquid solution of an oxidant, such as hydrogen peroxide, or a solid, such as nickel dioxide. The latter may be regenerated either chemically, by immersion in an oxidizing solution, or electrically, by using the gaseous diffusion type of hydrogen electrode to also reduce oxygen from ambient air.

23 Claims, 6 Drawing Figures

ELECTROCHEMICAL POWER GENERATION APPARATUS AND METHODS

This is a continuation-in-part of my copending applications Ser. No. 20,967, filed Mar. 16, 1979 (which is a divisional application of Ser. No. 843,155, filed Oct. 17, 1977, now U.S. Pat. No. 4,150,197), Ser. No. 917,406, filed Jun. 20, 1978, now U.S. Pat. No. 4,198,475 Ser. No. 704,452, filed July 12, 1976, now abandoned and Ser. No. 938,395, filed Aug. 31, 1978, now U.S. Pat. No. 4,207,382 the last of which is a continuation of my now abandoned application Ser. No. 813,483, filed July 7, 1977.

BACKGROUND OF THE INVENTION

This invention relates to improved methods and apparatus for generating electrical energy, heat, and an aluminum hydroxide reaction product from the oxidation of aluminum, especially aluminum waste and other inexpensive aluminum products.

These copending applications deal with various improvements in methods and apparatus for deriving electrical energy from the electrochemical oxidation of various forms of aluminum and its alloys. Although the intended use of the derived electrical energy has been primarily for the propulsion of electric vehicles, some stationary systems may also benefit from the availability of power sources utilizing aluminum, especially aluminum refuse or other inexpensive forms of aluminum, as the primary electrochemical fuel.

To generate electrical energy, the aluminum is consumed in a reaction chamber, wherein it reacts either directly as a consumable anode or indirectly by first yielding an intermediary compound, such as hydrogen, which in turn serves as the anode reactant in a separate electrochemical cell, as described in one embodiment of my afore-cited copending application Ser. No. 20,967, filed Mar. 16, 1979.

Some aluminum alloys containing appreciable concentrations of iron and other impurities tend to corrode at an excessive rate, especially at temperatures above 50° C., and may therefore not be suitable for direct use as consumable anodes in electrochemical cells designed for motor vehicle propulsion. Their indirect use via generation of hydrogen for electrochemical consumption in hydrogen/air fuel cells, as disclosed in my last-mentioned application, may be beneficial for only a limited number of stationary systems. The main reason for the limited applicability of such indirect energy generation from the consumption of aluminum is the relatively high cost of hydrogen/air fuel cells and their relatively low cell voltage and power density.

It is an object of my present invention to provide power sources capable of utilizing a wide variety of inexpensive aluminum alloys, especially those currently lost in refuse, as electrochemical fuel for such widespread applications as the propulsion of electric vehicles.

It is a further object of my invention to provide power sources wherein indirect electrical energy generation from the consumption of aluminum yields higher cell voltages and power densities than those obtainable with hydrogen/air fuel cells.

It is yet another object of my invention to render such power sources far less expensive than those utilizing hydrogen/air fuel cells.

It is still another object of my invention to provide apparatus and methods whereby hydrogen derived from the consumption of aluminum waste or other inexpensive forms of aluminum may serve as a consumable anode reactant in hydrogen/nickel dioxide, hydrogen/silver oxide, hydrogen/hydrogen peroxide and other electrically or chemically rechargeable electrochemical cells.

In my last-mentioned copending application Ser. No. 20,967, filed Mar. 16, 1979, I have also disclosed the use of corrosion-inhibiting additives in the electrolyte from the group comprising stannate ions, gallate ions, indic hydroxide, thallous hydroxide, and mercuric oxide. Each ion or compound of the latter group comprises a species more noble than aluminum, i.e., which plates out spontaneously onto an aluminum surface at the expense of aluminum ions. A piece of aluminum immersed in such an electrolyte would therefore get rapidly covered with an alloy layer rich in the additive metal, and any further dissolution of aluminum would thereafter proceed through the intermediary of this alloy layer, which is much less prone to corrode than the original metal. Electrochemical consumption of aluminum under these conditions might therefore be also viewed as proceeding indirectly via said intermediary alloy layer.

Similarly, zinc compounds, especially zincate ions, are known to react spontaneously with aluminum metal to form metallic zinc and aluminum ions. However, I have found that zinc layers formed on aluminum surfaces in alkaline solutions usually tend to flake off. When a slurry of zinc or zinc-coated particles impinges on an aluminum surface, there is a competition between the rate of further deposition of zinc on the preexisting zinc surfaces and the rate of formation of zinc on the aluminum, with the former usually prevailing. Moreover, the zinc deposited on the aluminum flakes off and breaks up easily, and eventually gets mixed in with the slurry.

The use of aluminum, especially in powdered form, to regenerate zinc from zincate ions in zinc/oxygen or zinc/air batteries has been disclosed by Doniat et al., U.S. Pat. No. 3,981,747, issued Sept. 21, 1976, and by Michelin & Cie, British Pat. No. 1,536,840, published Dec. 20, 1978. However, these patents do not disclose the means for selectively removing the aluminum hydroxide reaction product which is bound to form and accumulate upon prolonged consumption of aluminum in a continuously operating system. Moreover, the use of aluminum in form of a powder is bound to result in appreciable corrosion losses.

It is therefore one of the purposes of my invention to provide the means for continuously recharging a zinc-air battery with aluminum waste and other inexpensive aluminum products so as to generate heat, electrical energy, and aluminum hydroxide, and for selectively separating the aluminum hydroxide from the electrolyte and from the zinc slurry particles.

It is still a further object of my invention to improve the current efficiency and energy conversion efficiency achievable through such an indirect electrochemical consumption of aluminum products.

SUMMARY OF THE INVENTION

Briefly, my invention consists of providing a reaction chamber wherein aluminum pieces of various shapes and sizes, up to a certain maximum predetermined size, may be introduced upon demand and reacted with an aqueous electrolyte solution to generate heat, aluminum hydroxide, and an intermediate reactant, and means for oxidizing said intermediate reactant in an electrochemical cell, thereby generating electrical energy. The intermediate reactant is preferably hydrogen or zinc. The latter may be used in a slurry type zinc/air battery, whereas hydrogen is preferably reacted in conjunction with a nongaseous cathode reactant, which may be a liquid solution comprising an oxidant, such as hydrogen peroxide, or a solid, such as nickel dioxide. The latter may be regenerated either chemically, by immersion in an oxidizing solution, or electrically, by using the gaseous diffusion type hydrogen electrode(s) to also reduce oxygen from ambient air.

BRIEF DESCRIPTION OF THE DRAWINGS

My invention is best explained with reference to the drawings, in which.

DESCRIPTION OF THE PREFERRED EMBODIMENTS

Figure 2:
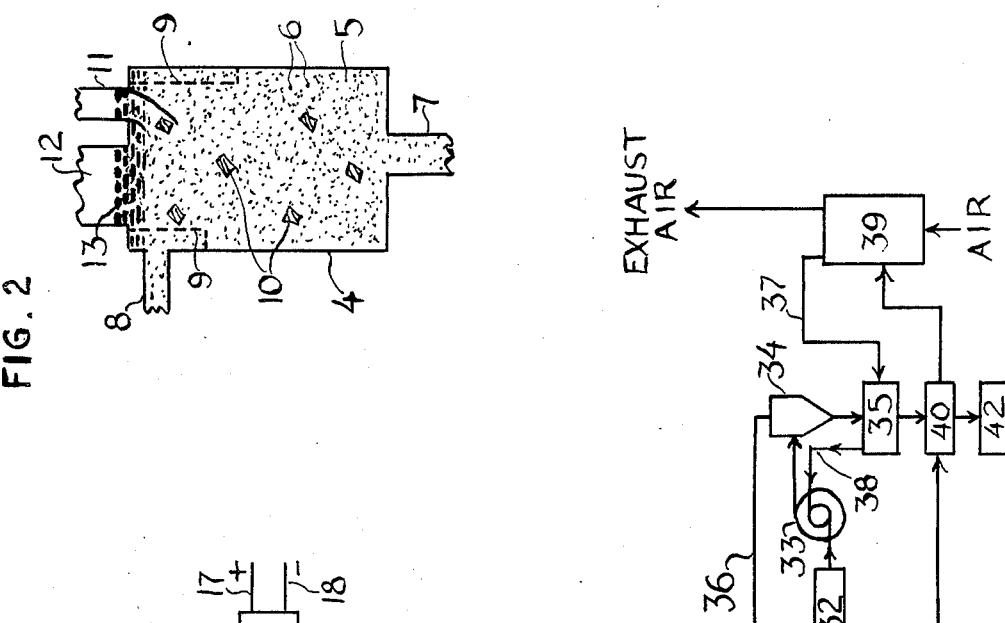
FIG. 2 is a partial schematic cross-sectional view of the reaction chamber 3 of FIG. 1.
Figure 1:
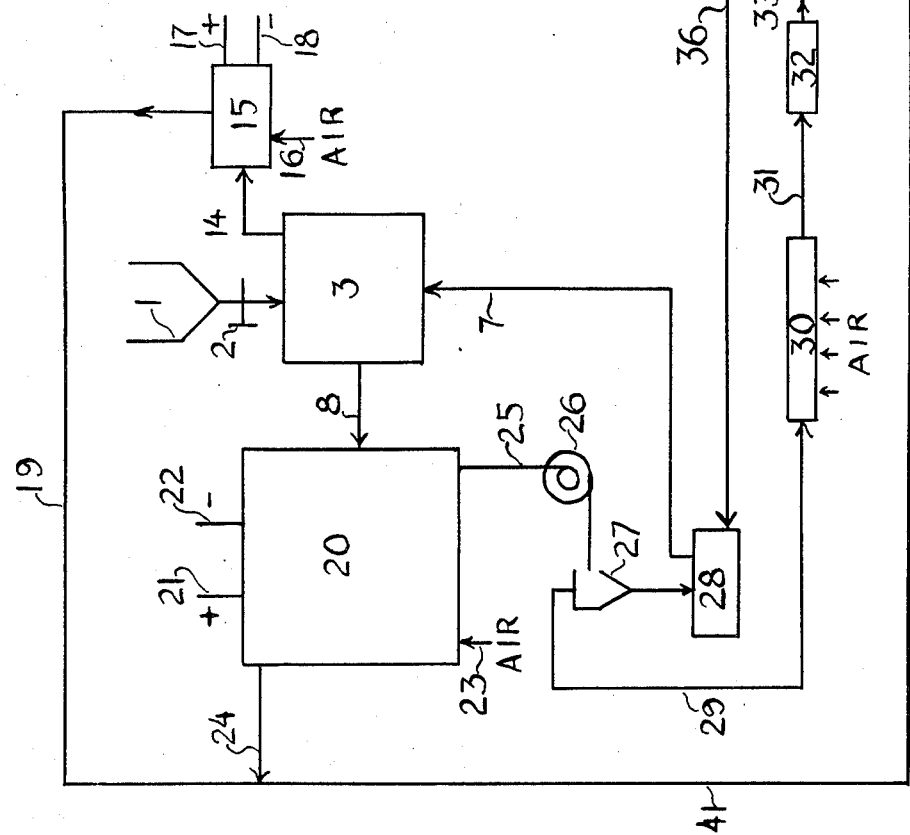
FIG. 1 is a block diagram of one preferred embodiment of my invention.

In the preferred embodiment represented by the block diagram of FIG. 1, aluminum pieces are fed upon demand from a hopper 1 by means of an electrically actuated control valve mechanism 2 into a reaction chamber 3. The valve mechanism 2 may be similar to one of those described in my copending application Ser. No. 917,406, filed June 20, 1978, or else it may involve a shear-like motion of one or two blades to effect opening or closure of the valve. As shown in FIG. 2, the reaction chamber 3 may comprise an external cylindrical or rectangular enclosure 4, made of polyethylene, polypropylene or any other material capable of withstanding a slurry of zinc-covered particles 6 in an alkaline electrolyte solution at temperatures of up to about 60° C., an inlet tube 7, an outlet tube 8, separated from the interior of chamber 3 by a wide-open screen 9, which may be of substantially the same material as the interior wall of reaction chamber 3. The openings in screen 9 should be large enough to pose no significant obstruction to the flow of the slurry 5, and of the zinc-coated particles 6 suspended therein, yet small enough to prevent an entrainment of the aluminum chips 10. The latter are introduced intermittently into chamber 3 through a short upper tube 11 connected to the valve mechanism 2.

The zinc-covered particles 6 may comprise carbon or silicon carbide cores, preferably about 20 to 40 microns in diameter, covered with copper and an outer layer of zinc, so as to preferably yield an average specific gravity of between 3 and 4 grams/cm$^3$. The slurry entering through inlet 7 is preferably at a temperature of about 45° C., and is depleted of zinc but enriched in zincate ions. As the slurry comes in contact with the aluminum chips 10, it becomes enriched in zinc metal and aluminate ions at the expense of zincate ions. This reaction generates sufficient heat to raise the slurry temperature by about 10° C., i.e., to about 55° C. near the outlet 8, the rate of slurry circulation in properly designed and controlled systems being adequate to prevent an excessive temperature buildup within chamber 3.

Most of the zinc generated in chamber 3 will tend to plate onto the zinc-coated slurry particles. The zinc forming on the aluminum surfaces tends to flake off and get broken up into finer particles by the impact of the slurry particles, and gets entrained with the other slurry particles into the zinc/air battery 20.

The total exposed area of the aluminum chips 10 immersed within slurry 5 should preferably be barely sufficient to permit reduction of the excess of zincate ions passing through chamber 3, but should preferably not appreciably exceed this bare requirement so as to avoid loss of energy efficiency through hydrogen generation. To minimize such energy losses, any hydrogen generated in chamber 3 may be collected in the space 12 above the electrolyte level 13 and fed through a tube 14 to a small auxiliary hydrogen/air fuel cell 15 (FIG. 1), comprising also an air inlet 16, positive and negative terminals 17 and 18, respectively, and a warm air outlet 19.

The zinc-enriched slurry exiting through tube 8 is fed into a zinc/air battery 20. Slurry type zinc/air batteries have been described extensively in the technological literature, e.g., in publications by A. J. Appleby et al. in the Proceedings of the 1975 Intersociety Energy Conversion Engineering Conference, pages 811-816, and need therefore not be elaborated upon here. However, thanks to the use of zinc-covered particles of specific gravity between 3 and 4 grams/cm$^3$, which is about half of that of solid zinc particles, it becomes permissible in the present embodiment to use a less viscous, and hence more conductive, electrolyte. This, in turn, results in smaller ohmic losses, and hence in higher cell voltages at comparable current densities or higher current densities at comparable voltages than in previously disclosed zinc/air batteries.

The electrical current from the zinc/air battery 20 is withdrawn via the positive and negative terminals 21 and 22. Fresh air is supplied to the battery via inlet 23, and the partly oxygen-depleted air leaves through outlet 24. The partly zinc-depleted zincate-enriched slurry leaving the battery 20 through outlet 25 at a temperature of about 60° C. is fed by pump 26 into a cyclone separator 27, wherefrom the zinc-covered particles are expelled into chamber 28, with the clear supernatant liquid exiting through line 29 into an air-cooled heat-exchanger 30. The liquid exiting from heat exchanger 30 via outlet line 31 should be preferably at about 45° C. At this temperature, the excess aluminate ions will precipitate out of the electrolyte when exposed to aluminum hydroxide seeds in the precipitator 32. The aluminum hydroxide slurry from precipitator 32 is forced by pump 33 through a cyclone separator 34, wherefrom the aluminum hydroxide is expelled into chamber 35, while the supernatant liquid is returned via line 36, chamber 28, and line 7 into the reaction chamber 3. When passing through chamber 28, the liquid from cyclone 34 entrains the zinc-coated particles and returns them to chamber 3, thereby completing one entire cycle.

The aluminum hydroxide expelled from cyclone 34 contains some adsorbed zincate and other ions from the electrolyte. To minimize such electrolyte losses, the precipitate in chamber 35 may be rinsed with distilled water from line 37, and the rinsings may be recirculated via line 38 and pump 33 into the cyclone 34. The distilled water in line 37 originates from the condenser 39, wherein humid and warm air leaving the aluminum hydroxide dryer 40 is cooled with ambient air, thereby being caused to give up its excess moisture.

Both the zinc/air battery 20 and the hydrogen/air fuel cell 15 operate preferably at a temperature of about 60° C. The air fed to the cathodes of each of these power sources is allowed to approach the 60° C. temperature, and is thereafter fed through lines 19, 24, and 41 into the aluminum hydroxide dryer 40, wherein it is blown through the previously rinsed aluminum hydroxide from chamber 35. Dryer 40 may comprise a plurality of porous tetrafluoroethylene membranes (not shown) through which the air from line 41 may freely pass, but which prevent the entrainment of solid particles. The dried aluminum hydroxide may then be transferred into an aluminum hydroxide storage bag 42.

Of course, the aluminum hydroxide rinsing and drying operations, as well as the transfers of aluminum hydroxide from chamber 35 to dryer 40 and then to storage bag 42, may be preferably effected in discontinuous steps.

If the zinc/air battery 20 is properly designed, its output at a current density of about 0.08 ampere/cm$^2$ should be at least 1.25 volt/cell. Similarly, in a well-designed reaction chamber 3, at least 90% of the aluminum consumed, and usually more than 95% of that aluminum, should be converted into zinc metal. The overall result is an electrical energy yield of about 40% of the free energy of reaction between aluminum and oxygen in aqueous solution at room temperature.

Figure 3:
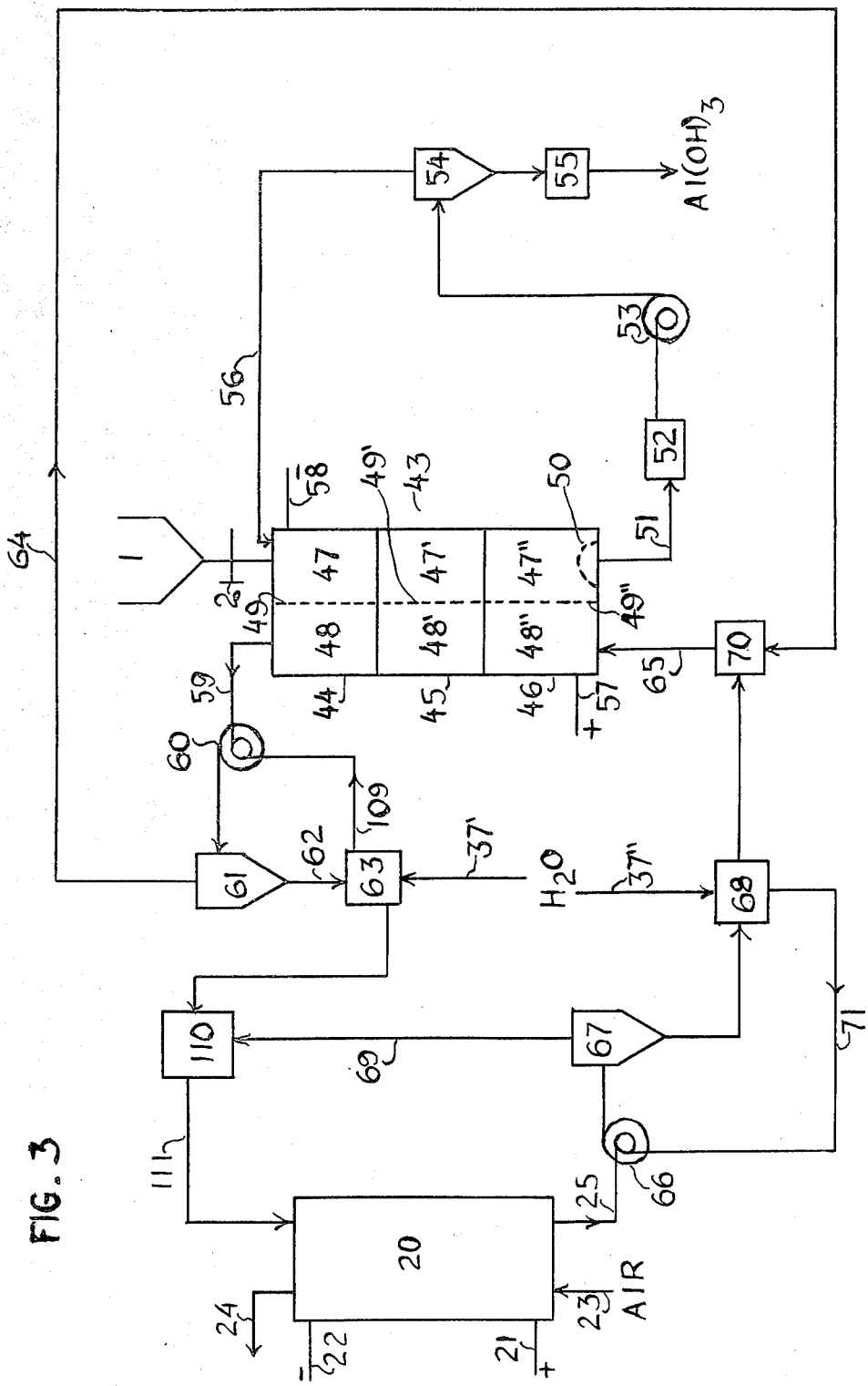
FIG. 3 is a block diagram of a variant of the first embodiment.

Such an electrical energy yield appears to be quite satisfactory, especially when derived from aluminum products which are currently being lost in refuse. However, certain more expensive aluminum alloys, e.g., those containing up to 0.1% of indium, gallium or thallium, are capable of higher energy efficiencies. For instance, such alloys have been reported to yield a working anode potential within 0.55 volt of the the theoretical value at a current density of 0.03 ampere/cm$^2$ in a neutral 2N NaCl solution. However, the poor performance of air cathodes in neutral solutions has prevented the full exploitation of these results. To take advantage of the characteristics of such alloys, or of any other superior anode-electrolyte combinations yet to be discovered, one may resort to the scheme of FIG. 3, which is a modification of the embodiment of FIG. 1.

Here again are aluminum particles from hopper 1 fed upon demand via valve 2 to a reaction chamber 43. However, this reaction chamber now constitutes an aluminum/zinc battery, wherein aluminum is consumed at the anode, while zinc ions are reduced to zinc metal at the cathode. The zinc ions may be dissolved in electrolyte number 1, which may be a slightly alkaline solution of ammonium chloride. The chamber or battery 43 may comprise a plurality of series-connected cells 44, 45, 46, each comprising an aluminum anode compartment 47, 47', 47", which may be either of the packed-bed or of the fluidized-bed (i.e., slurry) type, and a zinc slurry cathode compartment 48, 48', 48" separated by a diaphragm 49, 49', 49". The output of each cell will depend, of course, on the characteristics of the anode-electrolyte combination used. However, with the aforementioned special alloys reported to yield a working anode potential within 0.55 volt of the theoretical value, the output of each cell should be between 0.3 and 0.4 volt at apparent current densities of at least 0.3 ampere/cm$^2$, the apparent electrode area being usually at least ten times smaller than the actual surface areas of the respective slurry or packed-bed particles. The current from battery 43 is withdrawn via the positive and negative terminals 57 and 58.

With slurry-type aluminum anodes, the last compartment 47" may contain a screen 50 near its outlet 51 to prevent entrainment of any sizable aluminum particles. The slurry leaving through exit 51 contains therefore mainly aluminum hydroxide admixed with some very fine particles of unconsumed aluminum. By making the openings in screen 50 sufficiently small, it is possible to make certain that the fine aluminum particles escaping through outlet line 51 constitute an insignificant faction of the aluminum introduced from hopper 1.

The slurry from outlet 51 may be pumped through a precipitator 52, wherein seeds of aluminum hydroxide assure complete precipitation of any excess aluminate in the electrolyte, and thence via pump 53 through cyclone separator 54, from which the aluminum hydroxide is expelled into chamber 55, while the supernatant liquid is returned via line 56 into the first slurry anode compartment 47. The aluminum hydroxide in chamber 55 may then be rinsed, dried, and collected using apparatus (not shown) analogous to chambers 35, 40, and 42 of FIG. 1.

The zinc-enriched slurry leaving cathode compartment 48 via line 59 is forced by pump 60 through a cyclone separator 61, from which the zinc-coated particles are expelled via line 62 into a rinsing chamber 63, while the clear electrolyte is returned via lines 64 and 65 back into a cathode compartment 48". Rinsing chamber 63 is intermittently supplied with distilled water from line 37', which may originate from apparatus (not shown) similar to condenser 39 of FIG. 1, and said chamber is intermittently emptied, with the rinse solution being returned via line 109 and pump 60 into cyclone 61, while the rinsed zinc-coated particles are expelled into a mixing chamber 110. Here they are mixed with electrolyte number 2, which may be an alkaline solution, e.g., 3 to 10 M KOH nearly saturated with zincate ions, and carried through line 111 into a zinc/air battery 20 similar to that of FIG. 1, and comprising similar components, including an air inlet 23, an air outlet 24, positive and negative battery terminals 21 and 22, and a slurry outlet line 25.

The slurry leaving through line 25 comprises zinc-coated particles covered with a thin layer of zinc hydroxide. It is forced by pump 66 through a cyclone separator 67 from which the zinc/zinc hydroxide-coated particles are expelled into a rinsing chamber 68, while the clear electrolyte is returned via line 69 and mixing chamber 110 through inlet line 111 back into the zinc/air battery 20. In mixing chamber 110, the alkaline electrolyte from cyclone 67 gets mixed with the zinc-coated particles from rinsing chamber 63, and entrains these particles in form of a slurry into the battery 20.

The zinc/zinc hydroxide-coated particles in chamber 68 are intermittently rinsed with distilled water from line 37", again originating from apparatus resembling condenser 39 of FIG. 1, and are intermittently expelled into mixing chamber 70. Here they are mixed with electrolyte number 1, which is recirculated from cyclone 61 via line 64. This electrolyte being slightly ammoniacal, the zinc hydroxide coating dissolves therein, forming a stable $Zn(NH_3)_4^{++}$ complex. The rinse solution from chamber 68 is recirculated via line 71 and pump 66 through the cyclone 67.

Continued addition of rinse solution to electrolyte number 2 would result in excessive dilution of the latter electrolyte unless counterbalanced by an equivalent water loss. To effect such a water loss and to meet the rinsing water requirements, the air supplied to the zinc-/air battery 20 through inlet 23 is left sufficiently dry to cause the required partial evaporation of electrolyte number 2 through the air-depolarized cathodes of battery 20. The warm and partly humidified air leaving through outlet 24 may then be processed as indicated in FIG. 1.

The foregoing scheme permits the discharge of zinc-coated particles in an alkaline zinc/air battery, thereby permitting air cathode operation under optimal conditions, while recovering additional electrical energy from the regeneration of zinc at the expense of aluminum in a nearly neutral electrolyte solution. Mixing of the two electrolytes is minimized by first separating the zinc-or zinc/zinc hydroxide-coated particles from their respective electrolytes, and thereafter removing most of the electrolyte adhering to these particles by rinsing with distilled water. The latter may be obtained by utilizing the heat generated in the battery reactions to remove water adhering to the aluminum hydroxide, as in the scheme of FIG. 1, and also to cause evaporation of some water through the porous diffusion cathodes, and thereafter condensing the evaporated water by cooling with ambient air.

Figure 4:
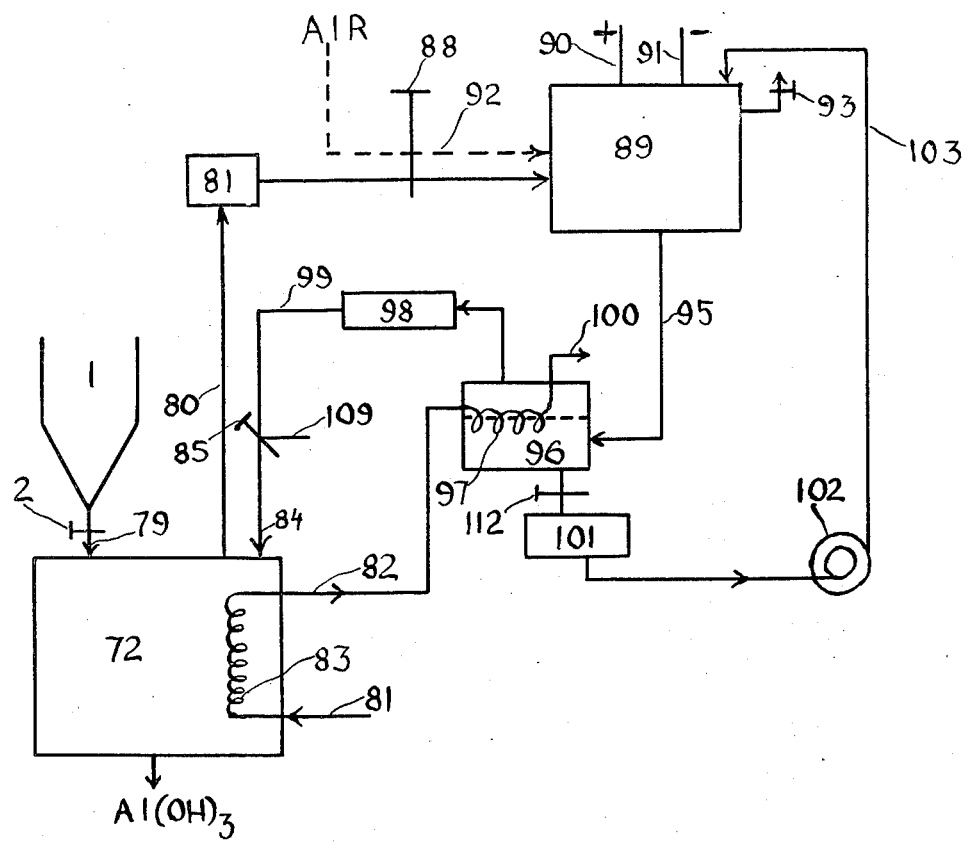
FIG. 4 is a block diagram of a second preferred embodiment of my invention.
Figure 5:
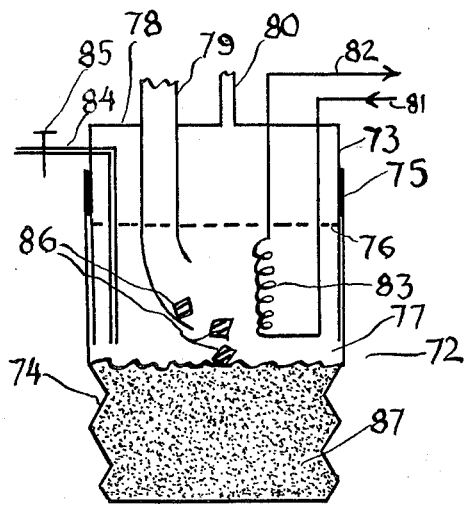
FIG. 5 is a schematic cross-sectional view of the reaction chamber 72 of FIG. 4.
Figure 6:
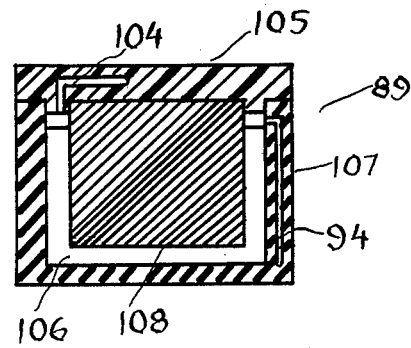
FIG. 6 is a schematic cross-sectional view of one of the cells making up the battery stack 89 of FIG. 4.

In the preferred embodiment of FIGS. 4 through 6, the aluminum from hopper 1 is again supplied on demand via a control valve mechanism 2 into a reaction chamber 72. However, the apparatus required in this case is much simpler than in the preceding embodiments. As shown in FIG. 5, the reaction chamber 72 may be made of two overlapping cylindrical enclosures—an inverted inner cylindrical container 73, capped at the top and open at the bottom, and an outer partly collapsible and expansible bag 74 fitting over enclosure 73 and clamped around its upper portion by a band 75 affixed above the level 76 of the electrolyte 77 so as to prevent leakage. Sealed to the cap 78 of the inner enclosure 73 may be a connecting tube 79 to the aluminum supply valve 2, a hydrogen outlet line 80, the inlet and outlet connections 81 and 82 to a heat exchanger 83, and an electrolyte or water supply or withdrawal tube 84 leading to a control valve 85.

Electrolyte 77 is preferably a 3 to 10 molar solution of sodium or potassium hydroxide. Aluminum pieces 86 introduced via tube 79 are attacked by this electrolyte with generation of hydrogen, aluminum hydroxide, and heat. The heat is removed by water circulating through the heat exchanger 83. The aluminum hydroxide precipitate 87 settles at the bottom of bag 74, and is removed periodically by first pumping out the supernatant electrolyte 77 via tube 84, valve 85, and side-arm 109 into a separate temporary storage container (not shown), and thereafter unclamping bag 74, replacing an empty bag, and pumping electrolyte 77 from said temporary storage container back into reactor 72. The hydrogen is fed via tube 80 to a hydrogen storage unit 81, and hence via control valve 88 to a hydrogen/nickel dioxide battery 89 (FIG. 4).

In battery 89, the hydrogen reacts with hydroxyl ions at a porous diffusion anode (not shown) to form water, while nickel dioxide reacts with water at the cathode 108 (FIG. 6) to form nickel hydroxide and hydroxide ions. The porous diffusion anode (not shown) is facing and parallel to cathode 108. The overall battery reaction

$$H_2 + NiO_2 \rightarrow Ni(OH)_2 \qquad (1)$$

has a theoretical electromotive force of 1.34 volt/cell. The usual operating voltage between the positive and negative battery terminals 90 and 91 will range from 1.2 to 1.3 volt/cell depending on current drain.

Following discharge, the nickel oxide cathodes may be recharged either chemically or electrically. To recharge them electrically, the hydrogen supply to the porous diffusion anode is shut off by valve 88, and air is allowed to enter instead through line 92. To facilitate air circulation, an air exhaust valve 93 may be simultaneously opened. Terminals 91 and 9 are then respectively connected to the negative and positive terminals of a battery charger. The porous diffusion electrodes now serve as cathodes reducing oxygen from the air according to the reaction

$$O_2 + 2H_2O + 4e^- \rightarrow 4(OH^-) \qquad (2),$$

while nickel hydroxide is reoxidized to the dioxide:

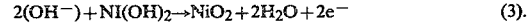
$$2(OH^-) + Ni(OH)_2 \rightarrow NiO_2 + 2H_2O + 2e^- \qquad (3).$$

The overall recharging reaction is then

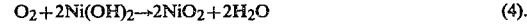
$$O_2 + 2Ni(OH)_2 \rightarrow 2NiO_2 + 2H_2O \qquad (4).$$

Although the theoretical electromotive force for reaction (4) is less than 0.1 volt/cell, the actual required charging voltage may be as high as 0.5 volt/cell due to the poor reversibility of the oxygen-reducing reaction at the present cathodes.

The water formed in the recharging reaction (4) would tend to cause excessive dilution of the electrolyte in battery 89 if allowed to continue uncorrected on repeated recharges. To prevent such dilution, the excess electrolyte is caused to drain from the battery through a channel 94 within the battery case 107 (FIG. 6) leading through an outlet line 95 (FIG. 4) to a water evaporator 96. During the battery discharge step, the warm water from heat discharger 83 is circulated through a second heat exchanger 97 which is immersed deep enough in the evaporator 96 to cause evaporation of any water reaching above or within its immersion level, this level being designed to correspond approximately to the desired elctrolyte concentration or to the evaporation of the amount of water formed in the preceding recharges. Once sufficient water has evaporated to bring the electrolyte level below that of heat exchanger 97, the heat transfer between this exchanger and the electrolyte becomes negligible, and there is no further evaporation.

The water vapor from evaporator 96 may be condensed in an air-cooled condenser 98, and the condensed water may be fed via line 99 and valve 85 into the aluminum-water reactor 72. The warm water from heat exchanger 97 may be fed through an outlet line 100 to either a space-conditioning unit or to an air-cooled heat-exchanger (not shown) and recirculated thence to the cool water inlet 81.

At the end of each discharge run, the concentrated electrolyte remaining in evaporator 96 may be transferred to a container 101 by opening a drain valve 112.

The latter may thereafter be closed to assure retention within evaporator 96 of the somewhat diluted excess electrolyte formed in the recharge reaction (4). At the start of each new discharge run, the concentrated electrolyte from container 101 may be returned via pump 102 (which may be a hand-powered pump) and line 103 through a distributing manifold 104 within the cover 105 (FIG. 6) back into the various battery electrolyte compartments 106. The variations in the battery electrolyte concentration are thereby maintained within tolerable limits.

For maximum efficiency, the electrical recharging step should preferably be effected at a slow rate, e.g., overnight. However, it may sometimes be desirable to recharge the battery within a relatively short time so as to permit a prolonged discharge period with relatively brief recharging intervals. In such cases, it may be desirable to recharge the cathodes chemically by immersion in a moderately strong oxidizing solution, e.g., a solution of hypochlorite, hydrogen peroxide, hypobromite, chlorite, periodate, chlorate, bromate, or permanganate. For this purpose, the cathodes 108 (FIG. 6) may be firmly affixed to the battery cover 105, so that the cathodes could be withdrawn from the battery by lifting the cover 105 off the battery case 107. The withdrawn cathodes can then be chemically recharged by immersion in an appropriate oxidizing bath.

Although the system of FIG. 4 yields a cell voltage comparable to that of FIG. 1, its overall energy conversion efficiency is lower considering that the electrical recharging step may require up to 0.5 volt/cell. However, the lower overall efficiency may be outweighed by the greater simplicity and much lower cost of the system. Although both systems require porous diffusion electrodes, hydrogen-depolarized anodes can support much higher current densities than air cathodes without excessive polarization, so that a much lower porous diffusion electrode area is required by battery 89 than by battery 20 for comparable power outputs.

As compared with other electrically rechargeable batteries, the system of FIG. 4 has the advantages of being amenable to chemical recharging, when necessary, and of consuming during the electrical recharging process only about one third of the energy which it delivers on discharge, the remaining two thirds being derived from aluminum products which are mostly lost in refuse nowadays, and which are likely to continue being lost in refuse in the absence of an attractive use for them. Moreover, as compared with the presently existing electrically rechargeable hydrogen/nickel oxide batteries, the system of FIG. 4 has the advantage of not requiring any large and potentially hazardous or expensive hydrogen storage containers. Even the recently developed metal hydride storage systems for hydrogen compare unfavorably with aluminum and water in terms of weight requirements, only 9 grams of aluminum plus 18 grams of water being required to generate 1 gram of hydrogen.

The scheme of FIG. 4 may obviously be used not only with nickel oxide, but with other solid oxide cathodes, e.g., with silver oxide, lead dioxide, or manganese dioxide. It may also be simplified by utilizing flow-through cathodes depolarized with hydrogen peroxide, similar to those disclosed in my copending application Ser. No. 917,406, filed June 20, 1978. Again, in lieu of hydrogen peroxide, other liquid oxidizing compounds may be used, e.g., one of the other aforecited moderately strong oxidizing solutions, especially a solution of one of the afore-cited halogen compounds.

Although alkaline solutions are usually preferred for reactors 3 and 72, it may be possible to achieve similar results with strong acids or even with nearly neutral solutions containing additives which break up the protective oxide layer on aluminum surfaces, e.g., compounds of mercury or gallium.

There will now be obvious to those skilled in the art many modifications and variations of the afore-disclosed embodiments, which, however, shall remain within the scope of my invention if defined by the following claims:

I claim:

1. Apparatus for generating heat and electrical energy from the consumption of a variety of aluminum products which comprises:
    (a) a reaction chamber containing an aqueous electrolyte solution and adapted for introduction therein of aluminum pieces of various shapes and sizes up to a certain maximum predetermined size and for effecting a chemical reaction between said aqueous electrolyte and said aluminum pieces yielding aluminum hydroxide and an intermediate reactant;
    (b) means for feeding said aluminum pieces into said reaction chamber in small quantities upon demand;
    (c) means for removing the heat generated in said chamber as a result of said reaction;
    (d) means for removing said aluminum hydroxide reaction product; and
    (e) means for oxidizing said intermediate reactant in an electrochemical cell, thereby generating electrical energy.

2. Apparatus of claim 1, wherein said intermediate reactant is hydrogen or zinc.

3. Apparatus of claim 2, wherein said intermediate reactant is zinc, and said electrochemical cell is a slurry-type zinc/air or zinc/oxygen battery.

4. Apparatus of claim 2, wherein said intermediate reactant is hydrogen, and said electrochemical cell comprises a nongaseous cathode reactant.

5. Apparatus of claim 4, wherein said cathode reactant is an oxidant in liquid solution.

6. Apparatus of claim 5, wherein said oxidant is hydrogen peroxide or a halogen compound.

7. Apparatus of claim 4, wherein said cathode reactant is a solid of the group consisting of manganese dioxide, lead dioxide, and silver oxide.

8. Apparatus of claim 4, wherein said cathode reactant is nickel dioxide.

9. Apparatus of claim 8, comprising means for withdrawing the cathodes of said cell for the purpose of effecting chemical regeneration of said nickel dioxide following discharge of said cell.

10. Apparatus of claim 8, comprising means for electrically recharging said nickel dioxide following discharge.

11. Apparatus of claim 10, comprising a gaseous diffusion electrode for the oxidation of hydrogen during the discharge reaction, and means for exposing said diffusion electrode to oxygen or air and for effecting therewith the electro-reduction of oxygen during recharge.

12. Apparatus as claimed in claim 3, wherein said aluminum pieces exceed a certain minimum predetermined size, and comprising a screen with openings small enough to retain most of said aluminum pieces within said reaction chamber.

13. Apparatus of claim 12, comprising zinc or zinc-coated slurry particles substantially smaller than the openings in said screen.

14. Apparatus of claim 13, wherein said zinc-coated particles have an average specific gravity of between 3 and 4 grams/cm$^3$.

15. Apparatus of claim 3, comprising means for precipitating aluminum hydroxide from said aqueous electrolyte solution while leaving most of the zincate ions in a dissolved state, and means for separating the precipitated aluminum hydroxide from said electrolyte solution and from said zinc-coated slurry particles.

16. Apparatus of claim 15, comprising means for utilizing some of the heat generated in said reaction chamber and/or in said zinc/air battery to evaporate water adhering to said precipitated aluminum hydroxide, and means for condensing said water and recovering it in distilled form.

17. Apparatus of claim 16, comprising means for removing electrolyte ions adsorbed onto said precipitate by rinsing said precipitate with said distilled water.

18. Apparatus of claim 17, comprising zinc or zinc-coated slurry particles, means for separating these particles from said electrolyte solution, and means for transferring these particles between said reaction chamber and said zinc/air battery in repeated cycles.

19. Apparatus of claim 18, wherein said reaction chamber constitutes an aluminum/zinc battery comprising an aluminum-consuming anode and a cathode at which dissolved zinc ions are reduced to zinc metal.

20. Apparatus of claim 19, wherein the electrolyte solution in said aluminum/zinc battery may have a substantially different composition than that in said zinc/air battery, and comprising means for rinsing the zinc or zinc-coated particles, separated from the electrolyte solution, with said distilled water, prior to their being transferred from one of said batteries to the other, and means for returning the rinsings to their respective electrolytes.

21. Apparatus as claimed in claim 4, wherein said reaction chamber comprises a capped inner container open at the bottom and a removable outer bag clamped around the upper outside portion of said inner container above the electrolyte level, so as to prevent leakage, said bag serving to collect and remove said aluminum hydroxide reaction product.

22. Apparatus of claim 11, comprising means for removing from the electrolyte of said electrochemical cell the excess water formed during recharge.

23. Apparatus of claim 22, wherein said means for removing the excess water is an evaporator utilizing part of the heat generated in said reaction chamber.

* * * * *